R. B. TABOR.
IMAGE PROJECTING MEANS.
APPLICATION FILED DEC. 22, 1917.
1,372,573.
Patented Mar. 22, 1921.
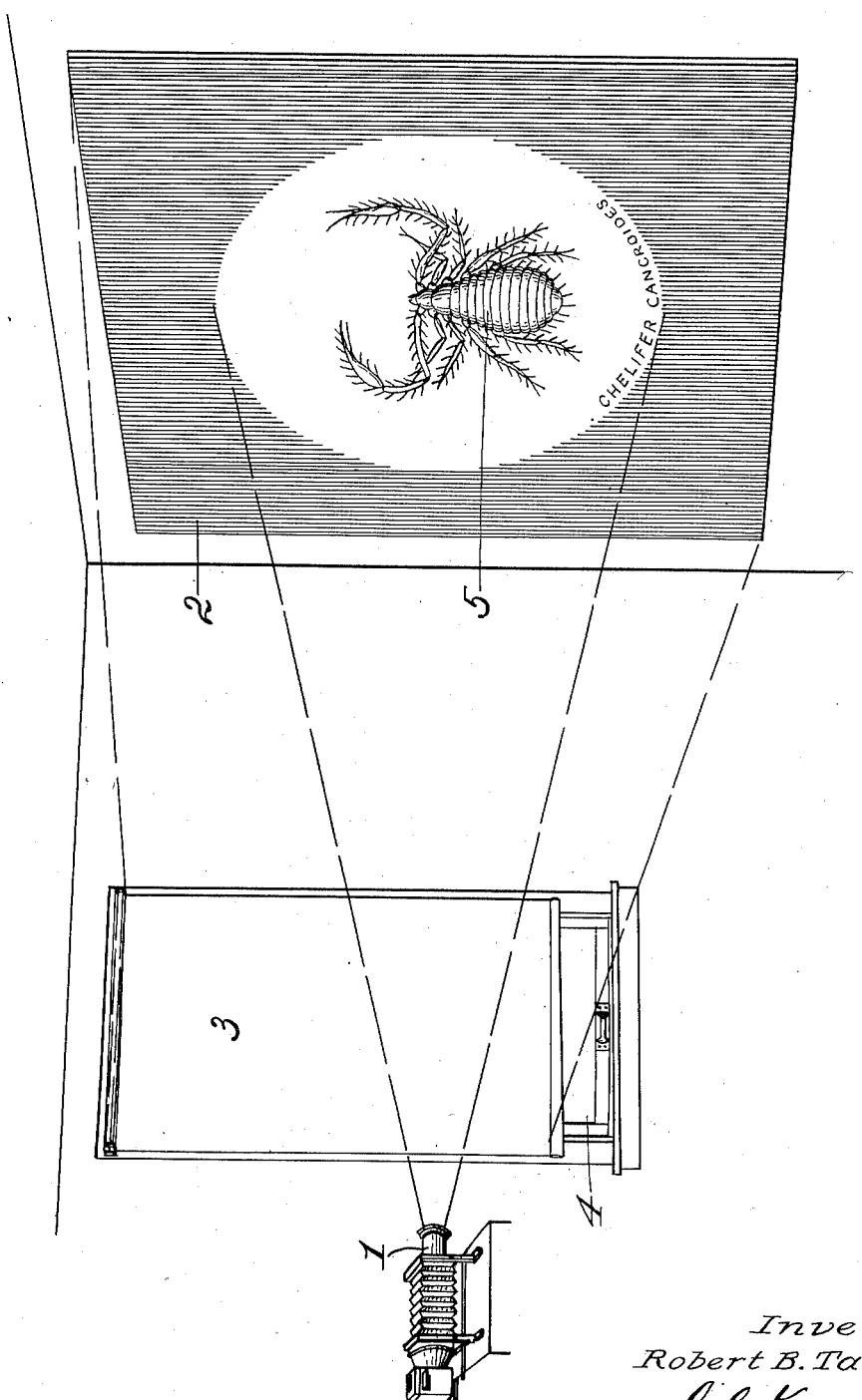
Inventor,
Robert B. Tabor, by
G.C. Kennedy,
Attorney.

UNITED STATES PATENT OFFICE.

ROBERT B. TABOR, OF INDEPENDENCE, IOWA, ASSIGNOR OF ONE-HALF TO C. E. RANSIER, OF WATERLOO, IOWA.

IMAGE-PROJECTING MEANS.

1,372,573.　　　Specification of Letters Patent.　　Patented Mar. 22, 1921.

Application filed December 22, 1917. Serial No. 208,441.

*To all whom it may concern:*

Be it known that I, ROBERT B. TABOR, a citizen of the United States of America, and a resident of Independence, Buchanan county, Iowa, have invented certain new and useful Improvements in Image-Projecting Means, of which the following is a specification.

My invention relates to improvements in image projecting means, and the object of my improvement is to provide means for rendering a screen capable of furnishing a visibly bright and clear image projection while in the presence of a subdued daylight, or daylight tempered by an admixture of certain colored rays, or in the presence of the latter alone.

This object I have achieved by the means which are hereinafter described and claimed, and which are illustrated in the drawing annexed hereto, which is a perspective view of a screen treated according to the method of my invention, a projector, and a secondary source of light producing rays operable upon the screen in a determined manner.

It is well known that the image produced upon a screen or receiving surface by a projector such as a stereopticon or other image producing means is not clearly defined while in the presence of the diffused rays of daylight, or in a situation where comparatively powerful light produced by a secondary source is permitted to impinge upon the screen during projection.

It is my purpose to supply means for permitting employment of a projector in daylight, or in the presence of subdued light, or selected colored rays of a certain character from a secondary source, to act together in a manner to bring out a projected image brightly and in a well defined manner upon the screen.

The drawing presented is a representation of an interior containing a projector such as the stereopticon 1, a screen 2 positioned to receive an image projected by the stereopticon, and both the stereopticon and the screen illuminated by a secondary source of light of a subdued character or containing an excess of certain colored rays, such as the window 4 covered or partially covered by a translucent curtain or shade 3.

The screen 2 is tinted with a color complementary to the color of the light transmitted through and brought to it by the shade 3.

It is also to be understood that it does not matter whether said means operate in the presence of a certain amount of subdued white light such as might be admitted below the partially raised shade 3, since the rays transmitted through said shade will supply a sufficient admixture of the complementary colored rays adapted to coact with those otherwise received by the screen from the primary source 1. This method of projection is thus useful, because permitting the use of a projector in the daytime, as in schools, auditoriums and other inclosures.

Said primary and secondary sources of light act simultaneously upon the screen, and a better definition is thereby given the projected picture or image.

Having described my invention, what I claim as new, and desire to secure by Letters Patent, is:

In combination, a body having a colored surface, an image-projector functioning to produce and project a white light and an image upon said surface, and a secondary source of light functioning to illuminate said surface with a light of a color different from the color of said surface adapted to act to enhance the distinctness of an image projected thereon by said projector.

Signed at Waterloo, Iowa, this 7th day of December, 1917.

ROBERT B. TABOR.